(No Model.)

E. G. COPELIN.
POT LID OR COVER.

No. 405,949. Patented June 25, 1889.

Witnesses
G. A. Tauberschmidt
S. F. Marshall

Inventor
Elizabeth G. Copelin
By her Attorney
A. G. Heysman.

UNITED STATES PATENT OFFICE.

ELIZABETH G. COPELIN, OF WASHINGTON, DISTRICT OF COLUMBIA.

POT LID OR COVER.

SPECIFICATION forming part of Letters Patent No. 405,949, dated June 25, 1889.

Application filed December 19, 1888. Serial No. 294,031. (No model.)

*To all whom it may concern:*

Be it known that I, ELIZABETH G. COPELIN, a citizen of the United States of America, residing at Washington, in the District of Columbia, have invented certain new and useful Improvements in Pot Lids or Covers, of which the following is a specification.

My invention relates to improvements in covers for pots and kettles; and the object is to provide a lid, which serves all the purposes of a cover, through which the condition of the contents of the vessel may be viewed without removing the cover.

My invention therefore consists in a pot or kettle cover composed of a transparent material—such as tempered glass or mica—as will hereinafter be more fully specified.

I have fully illustrated my invention in the accompanying drawings, wherein—

Figure 1:
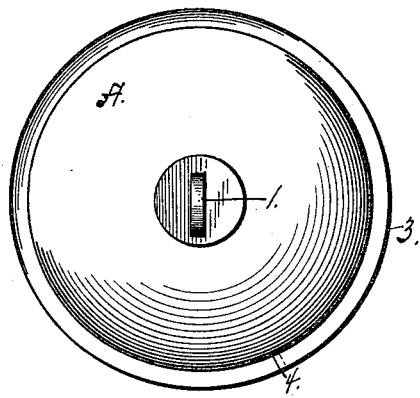
Figure 2:
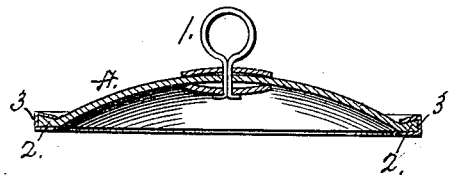
Figure 3:
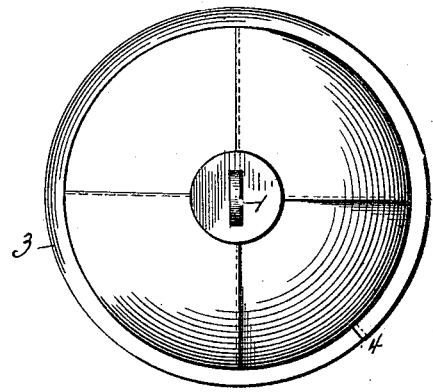

Figure 1 is a perspective of my improved cover. Fig. 2 is a central cross-section of the same. Fig. 3 is a view showing a cover made of mica.

Referring to the drawings, A designates the cover, made of tempered glass and having connected thereto a lifting-ring 1, which may be attached by means of a top and bottom plate, and a stem let through the plates and lid, and a nut arranged on the stem under the bottom plate; or the stem may be split and the projecting ends turned back on the cover. The edges of the cover are preferably thickened, as shown at 2, in order that a metallic rim-band 3 may be turned over the edge and lap both surfaces of the lid for a short distance. The rim-band 3 has its meeting ends lapped, as at 4, so that the expansion and contraction of the lid during use may not warp or break it. The cover being thickest at the edge and the rim-band ring bent thereon to conform to the construction, the band is held in place by the turned-over edges being nearer together than the parts directly at the edge of the cover.

In Fig. 3 I have shown a cover composed of mica. This is made up of sections cut to complete the cover, and has a clamp at the center with a ring or handle and the edges of the sections held by a rim-band clamped thereon.

It will be readily perceived that after the vessel has been supplied with its contents and the cover placed in position it will be unnecessary to lift the cover until the contents of the vessel are cooked, thus saving time and much annoyance.

Having thus described my invention, what I claim is—

As a new article of manufacture, the pot lid or cover made of glass and having the rim edge or flange 2 and the metallic rim-band 3, bent around the said rim-flange, the said metallic rim-band being split and having its ends overlapped, as at 4, and being thereby adapted to conform to the expansion and contraction of the glass cover or lid, substantially as described.

In witness whereof I have hereunto set my hand in the presence of two attesting witnesses

ELIZABETH G. COPELIN.

Attest:
  S. C. DALLAS,
  A. G. HEYLMUN.